Patented Mar. 25, 1924.

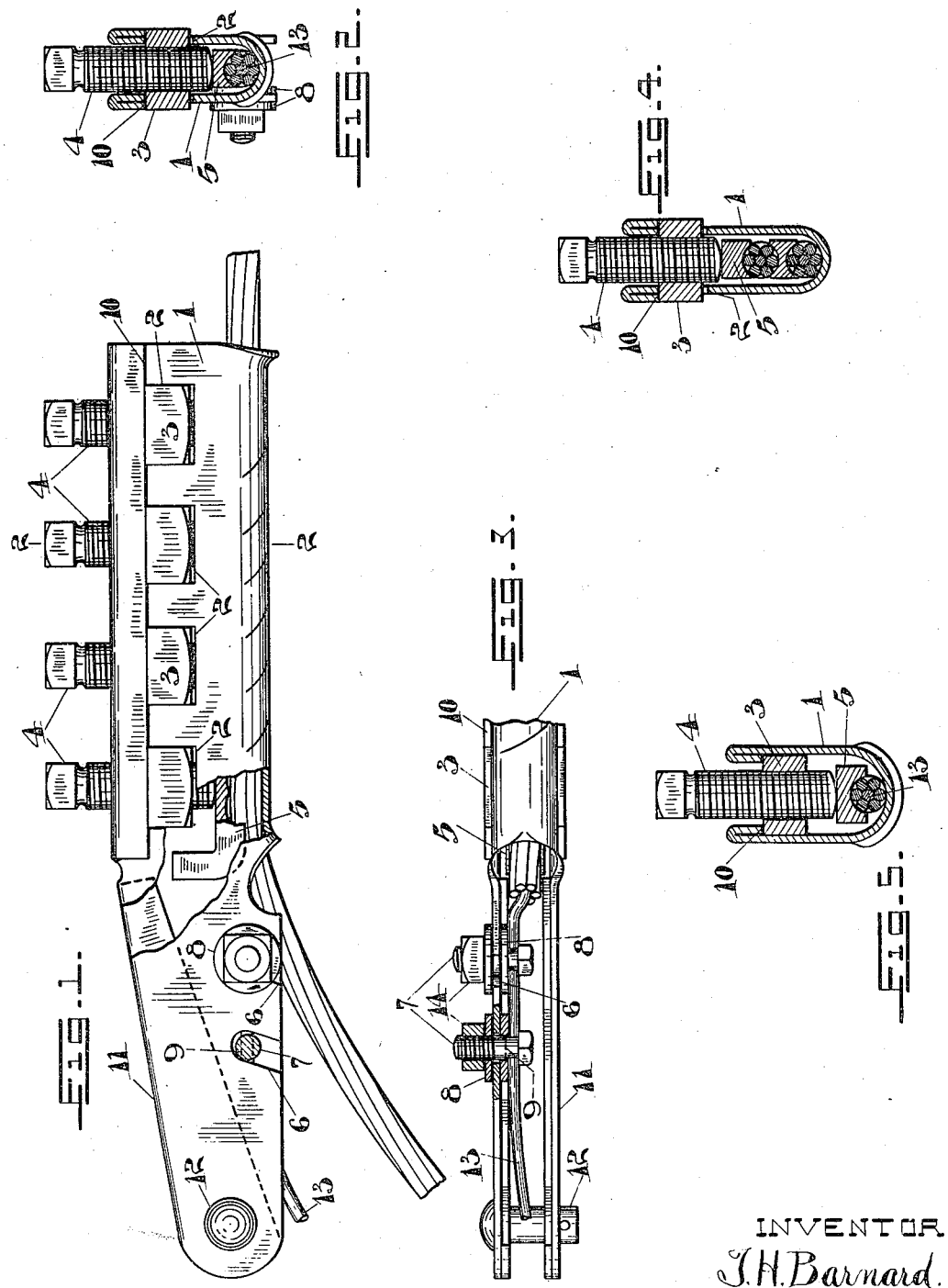

1,487,701

UNITED STATES PATENT OFFICE.

THOMAS H. BARNARD, OF TORONTO, ONTARIO, CANADA.

CLAMP.

Application filed February 27, 1923. Serial No. 621,658.

*To all whom it may concern:*

Be it known that I, THOMAS H. BARNARD, of the city of Toronto, in the county of York, Province of Ontario, Canada, a subject of the King of Great Britain, have invented certain new and useful Improvements in Clamps, of which the following is a specification.

This invention relates to devices commonly called strain clamps, which are generally used for anchoring the dead ends of electrical cables, although such devices are in some cases used in various combinations for supporting through cables, or for connecting the ends of electrical conductors.

In my prior application No. 579,478, filed August 3rd, 1922, I show a construction for this purpose, particularly adapted for securing heavy cables. The object of my present invention, however, is to devise a construction considerably lighter and cheaper to manufacture, but which will be amply strong to properly secure lighter cables in place.

I attain my object by means of the constructions hereinafter described and illustrated in the accompanying drawings in which—

Fig. 1 is a side elevation of my improved clamp;

Fig. 2 a section on the line 2—2 in Fig. 1;

Fig. 3 a detail of the under side of the clamp showing the core-clamping means; and Fig. 4 a modification showing the device as used for connecting the ends of the two cables; and Fig. 5 a sectional view illustrating a modified construction of the casing.

In the drawings like numerals of reference indicate corresponding parts in the different figures.

1 is the casing, which will usually be stamped up from the flat sheet into substantially channel form. In each leg of the channel are formed a plurality of openings 2, the openings in one side being opposite the openings in the opposite side. Supported in these holes are blocks 3 which will usually be ordinary nuts, through each of which is threaded a set screw 4. These blocks or nuts are of sufficient width to extend across the channel and extend into the openings at opposite sides of the channel.

Below the blocks 3 is located the clamping member 5, which is provided with an upturned end to prevent its accidental withdrawal under strain. The cable is received between this clamping bar and the bottom of the channel. To clamp the cable in position in the clamp, the screws 4, the ends of which engage the clamping bar, are tightened up as desired.

It will be noted from Figs. 1 and 2 that the upper portions of the legs of the channel are folded over on themselves to form longitudinal strengthening ribs or shoulders 10. This materially strengthens the casing and at the same time doubles the width of the bearing surface against which the blocks 3 rest. In some cases, it might be satisfactory to fold the upper ends of the channel legs inwardly as shown in Fig. 5 instead of outwardly, thus avoiding the necessity of forming the openings 2, as the blocks would be held in place against the under side of the ribs or shoulders 10.

The casing is provided at one end with an extension 11 through which extension adjacent the outer end thereof passes a bolt or rivet 12 by means of which the clamp may be secured in position. This extension is preferably open at the bottom. The sides of the extension are preferably folded back on themselves, the amount folded over being gradually increased from end to end so that at the point through which passes the bolt 12 the sides are of double thickness from top to bottom. It will be seen from the construction described that the casing and extension may be formed of a substantially rectangular piece of metal and that practically the only waste is the small piece cut away to form the opening in the bottom of the extension.

When additional protection is desired, I provide the special clamping means for the core which I will now describe. In one side of the extension 11 are formed one or more holes 6, through which are passed bolts 7, washers 8 being placed at each side of the frame. Through each bolt immediately below the head is formed a hole 9 through which the core 13 of the cable is passed. When the nut 14 on the bolt is tightened up, the core is firmly gripped between the head of the bolt and the adjacent washer. The washers might, of course, in some cases be omitted and the core clamped directly between the head of the bolt and the side of the casing. In some cases also it might be sufficient to omit the hole 9 and clamp the core between the head of the bolt and the side of the casing, although it is preferable to pass the core through a hole in the bolt as side slip of the core is thus prevented.

To simplify the passing of the core through the holes 9, the holes 6 are preferably formed as slots having open ends, so that the bolts may first be placed on the core and subsequently secured in the holes 6.

In Fig. 4 I show the device as used for clamping together the ends of two cables, a spacing member being positioned between the cables, and a grooved member between the lower cable and the bottom of the casing and a grooved member between the upper cable and the clamping member. No claim is made, however, in this application to the use of the spacing member and grooved members.

From the above description it will be seen that I have devised a clamp which will satisfactorily attain the object of my invention as set out in the preamble of this specification.

What I claim is:—

1. In a clamp for cables, the combination of a channel-shaped casing having an opening formed in each side thereof; a stationary block supported in said openings; and a movable member carried by said block by means of which a cable may be clamped against the bottom of the casing.

2. In a clamp for cables, the combination of a channel-shaped casing having a plurality of openings formed in each side thereof; stationary blocks extending across said casing and extending into opposite openings at each side; and movable members carried by said blocks by means of which a cable may be clamped against the bottom of the casing.

3. In a clamp for cored cables, the combination of a channel-shaped casing having an opening formed in each side thereof; a block supported in said opening and a member carried by said block by means of which a cable may be clamped against the bottom of the casing, a hole being formed in one side of the casing; a bolt passing through said hole; and a nut on said bolt by means of which the core of the cable may be clamped against the side of the casing.

4. In a clamp for cored cables, the combination of a channel-shaped casing having an opening formed in each side thereof; a block supported in said opening and a member carried by said block by means of which a cable may be clamped against the bottom of the casing, a hole being formed in one side of the casing; a bolt passing through said hole, said bolt having a hole formed therethrough adjacent the head to receive the core of the cable; and a nut on said bolt by means of which the core of the cable may be clamped against the side of the casing.

5. In a clamp for cored cables, the combination of a channel-shaped casing having an opening formed in each side thereof; a block supported in said opening and a member carried by said block by means of which a cable may be clamped against the bottom of the casing, a hole being formed in one side of the casing, said hole having an open side; a bolt passing through said hole; and a nut on said bolt by means of which the core of the cable may be clamped against the side of the casing.

6. In a clamp for cables, the combination of a channel-shaped casing, the legs of the channel being folded over upon themselves to form shoulders; a block adapted to engage said shoulders; and a member carried by said block by means of which a cable may be clamped against the bottom of the casing.

7. In a clamp for cables, the combination of a channel-shaped casing having an opening formed in each side thereof, the legs of the channel being folded over upon themselves to form shoulders; a block supported in said openings and engaging said shoulders; and a member carried by said block by means of which a cable may be clamped against the bottom of the casing.

8. In a clamp for cables, a channel-shaped casing, having an integral extension at one end thereof, the sides of said extension being folded over upon themselves, the amount folded over gradually increasing towards the free end of the extension, eyes being formed in said doubled parts of said sides.

9. In a clamp for cables, the combination of a channel-shaped casing, the legs of the channel being folded over upon themselves to form shoulders; a block adapted to engage said shoulders; and a member carried by said block by means of which a cable may be clamped against the bottom of the casing, said casing having an integral extension at one end thereof, the sides of said extension being folded over upon themselves, the amount folded over being gradually increased towards the free end of the extension.

10. In a clamp for cables, a channel-shaped casing having an open bottomed extension at one end thereof, the upper portion of the sides of said casing being folded over to form longitudinal shoulders and the upper portions of the sides of the extension being folded over upon themselves, the amount folded over being gradually increased towards the free end of the extension.

Signed at Toronto, Canada, this 29th day of January 1923.

THOMAS H. BARNARD.